J. JOY.
WATER TRAP.
APPLICATION FILED DEC. 11, 1909.
986,394.
Patented Mar. 7, 1911.
2 SHEETS—SHEET 2.
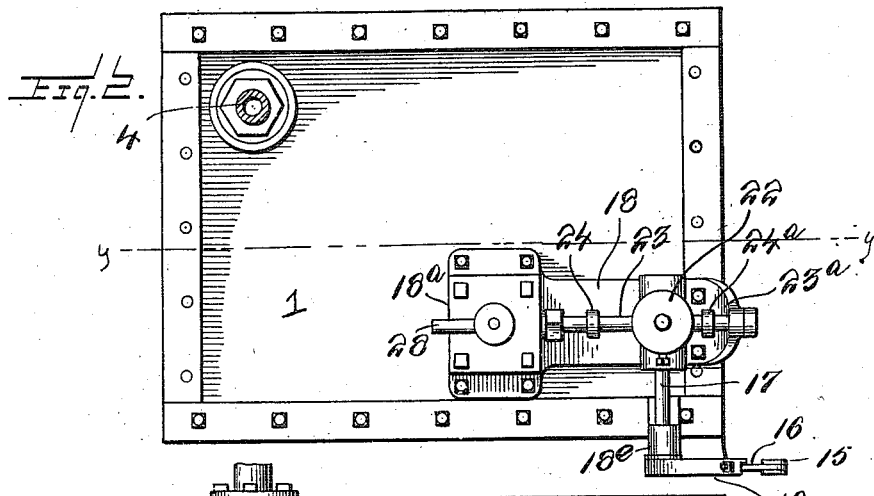
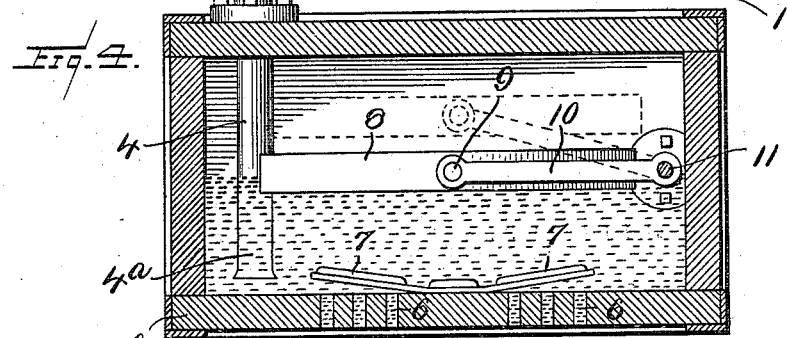
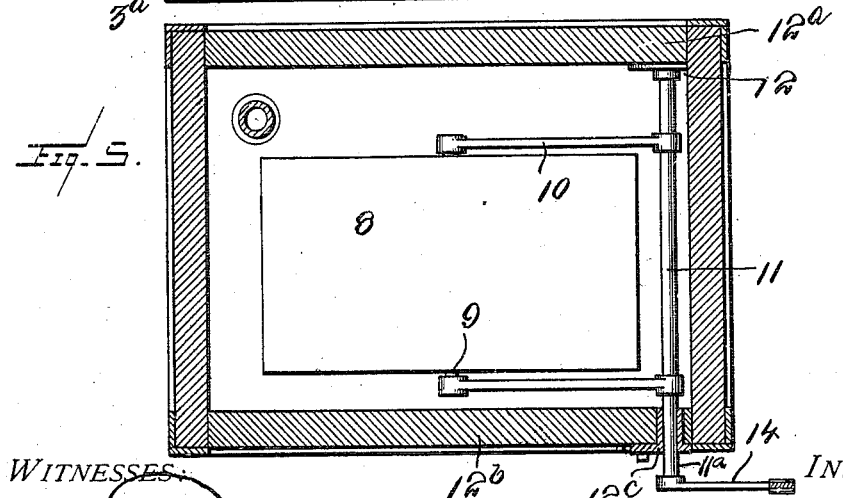
WITNESSES
INVENTOR
Joseph Joy
BY
Attorney

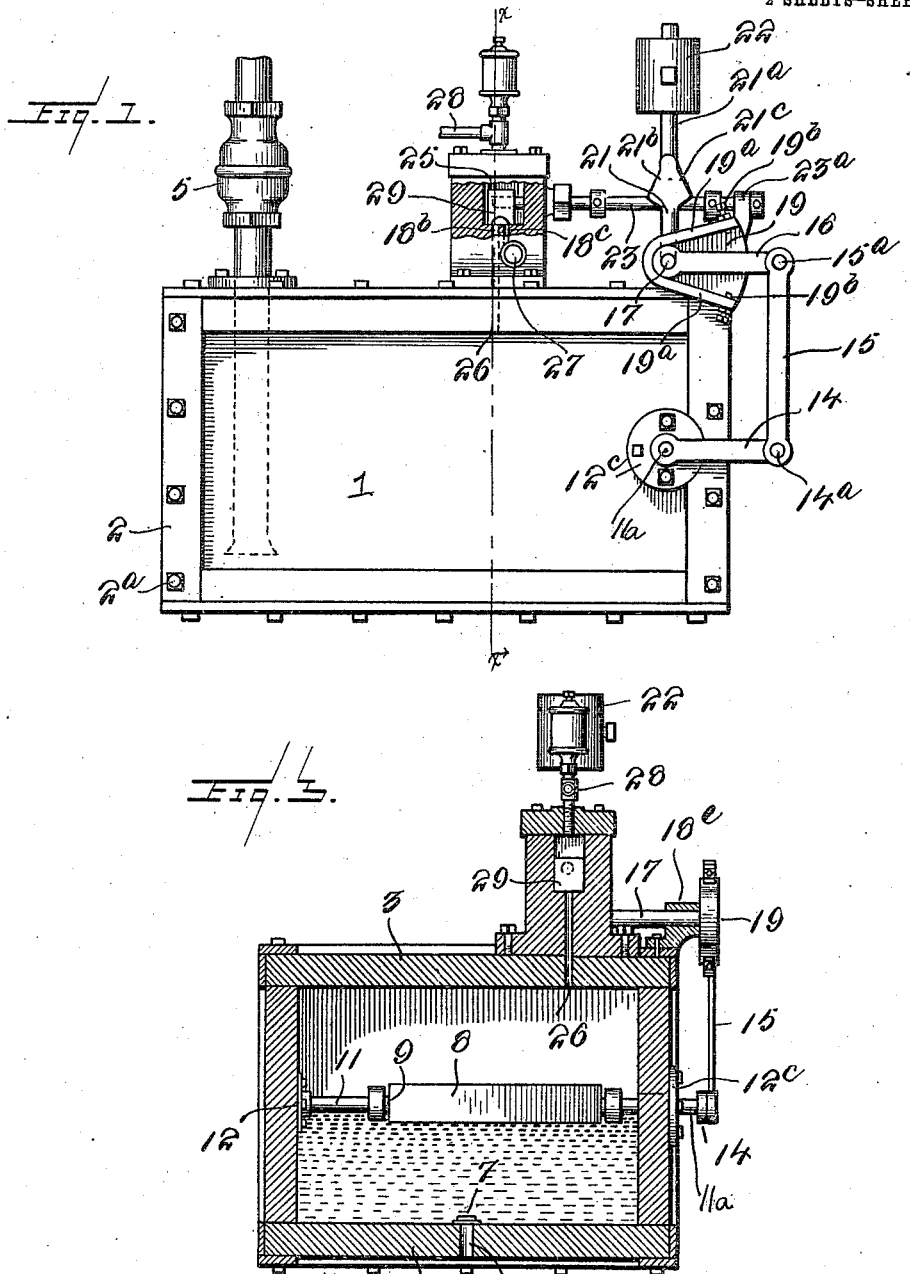

UNITED STATES PATENT OFFICE.

JOSEPH JOY, OF DONORA, PENNSYLVANIA.

WATER-TRAP.

986,394.  Specification of Letters Patent.  Patented Mar. 7, 1911.

Application filed December 11, 1909. Serial No. 532,629.

*To all whom it may concern:*

Be it known that I, JOSEPH JOY, a citizen of the United States of America, residing at Donora, in the county of Washington and State of Pennsylvania, have invented certain new and useful Improvements in Water-Traps, of which the following is a specification, reference being had therein to the accompanying drawing.

This invention relates to a water trap particularly adapted for use in mines for removing water therefrom and in this connection it will be stated that it is present practice to dig a pit in the mine, then drain the water into the pit and after draining it is discharged therefrom by the employment of a pump, the latter being used to pump the water out of the pit every time it becomes full. Such operation ordinarily is an expensive one, owing to the cost of the pump and also owing to the cost of operating the pump as in most instances the pump is a very large one.

To decrease the cost of draining a mine and to facilitate the discharge of the water are the primary objects of this invention and such objects are attained by providing a combined trap and water removing means in a manner as hereinafter set forth.

Further objects of the invention are to provide a combined trap and water removing means for the purpose set forth which shall be comparatively simple in its construction, automatically thrown into operation when the water in the trap rises or falls to a predetermined level, strong, durable, efficient in its use, readily set up in operative position and comparatively inexpensive to manufacture.

With the foregoing and other objects in view the invention consists of the novel construction, combination and arrangement of parts as hereinafter more specifically described and illustrated in the accompanying drawings wherein is shown the preferred embodiment of the invention, but it is to be understood that changes, variations and modifications can be resorted to which come within the scope of the claim hereunto appended.

In the drawings wherein like reference characters denote corresponding parts throughout the several views, Figure 1 is a side elevation broken away of a combined trap and water removing device in accordance with this invention, Fig. 2 is a top plan, Fig. 3 is a section on line $x-x$, Fig. 1, Fig. 4 is a section on line $y-y$, Fig. 3, and Fig. 5 is a sectional plan.

Referring to the drawings in detail 1 denotes a closed receptacle, which may be rectangular in contour if desired and which may be constructed of wooden members which are not susceptible to the chemical action of the acids within the mine water, the wooden members being bound together by metallic straps 2 maintained in position by hold fast devices $2^a$. In lieu of constructing the receptacle of the material set forth, it may be set up from any suitable material. Extending through the top 3 of the receptacle 1, at one corner thereof, and terminating at a point in proximity to the bottom $3^a$ of the receptacle is a discharge pipe 4 provided with a check valve 5. The lower end of the pipe 4 is flared as at $4^a$ and the pipe 4 extends from the pit in which the receptacle 1 is mounted, to a suitable discharge point. The pipe 4 is utilized for conducting the collected water from the mine and said water is forced through the pipe through the medium of a pressure of air.

The bottom $3^a$ of the receptacle 1 is provided with a plurality of inlet openings 6 adapted to be closed by the flap valves 7 which are secured to the inner face of the bottom $3^a$ by the hold fast device $6^a$. Arranged within the receptacle 1 is a rectangular float 8, having each side thereof provided with a stud 9 upon which is loosely mounted one end of an arm 10. Journaled at one end in the bearing 12 which is secured to the inner face of the side $12^a$ of the receptacle is one end of a shaft 11, the other end of said shaft extends through a bearing $12^c$ at the other side wall $12^b$ of the receptacle 1 as well as projecting from said wall $12^b$. The arms 10 have their other ends connected to the shaft 11 and by such an arrangement it is evident that when the float 8 is elevated by the water which enters the receptacle 1 through the inlet 6, the shaft 11 will be rocked, for the reason that the ends of the arms 10 which engage the shaft 11 are fixed thereto. When the float 8 lowers, the shaft 11 is rocked in the opposite direction.

The projecting end of the shaft 11 is indicated by the reference character $11^a$ and is provided with a crank arm 14 having its free end pivotally connected as at $14^a$ to the lower end of a link 15. The link 15 is vertically disposed and has its upper end pivotally connected, as at $15^a$ to a crank arm 16 carried on the outer end of the shaft 17 which is revolubly mounted in a bed plate 18 which supports the valve casing 18$^a$. The movement of the crank 16 in either direction is limited by a fixed V-shaped stop member carried by the bracket 18$^e$ and consisting of a body portion 19 formed with a pair of flanges 19$^a$ which oppose each other and each of which carries an adjustable top screw 19$^b$, one of the screws engaging the crank 16 on the movement of the crank in one direction thereby arresting its movement and the other of the screws 19$^b$ engaging the crank 16 on its movement in its opposite direction, thereby arresting travel of the crank. Fixed to the shaft 17 is a vertically disposed stirrup 21 provided with an upright 21$^a$ carrying a weight 22 at its top. The stirrup 21 is provided with inclined impacting surfaces 21$^c$ and 21$^b$ for the purpose to be presently referred to.

The bed plate 18 is secured to the top 3 of the receptacle at a corner thereof diagonally disposed to that corner in which is arranged the pipe 4 and said bed plate, as before stated, supports a valve casing 18$^a$ which is formed with a port 18$^b$, which communicates with the passage 26 formed in the top 3 of the receptacle 1 and through said passage is adapted to be supplied air under pressure for expelling the water collected in the receptacle 1 out through the pipe 4. The valve casing 18$^a$ is formed with a discharge port 18$^c$ which opens into an outlet 27. Communication is adapted to be established, when occasion so requires between the conduit 18$^b$ and the port 18$^c$ for exhausting the air from the receptacle 1. Such communication is established through the medium of a slide valve 29 which is provided with a stem 23 mounted at its outer end in a bracket 23$^a$ and carrying a pair of collars 24 and 24$^a$. The stem 23 extends through the stirrup 21 and when the shaft 17 is rocked so as to move the stirrup outwardly the surface 21$^c$ will engage the collar 24$^a$ and shift the valve stem 23 outwardly and thereby establish communication between the conduit 18$^b$ and the valve chamber 25, the latter communicating with the fluid pressure supply through the medium of the pipe 28. When the stem 23 is shifted outwardly the exhaust port 18$^c$ is closed by the valve 29. If the shaft 17 should be rocked in the opposite direction, the surface 21$^b$ will engage the collar 24 and shift the stem 23 inwardly and thereby close communication between the passage 18$^b$ and the chamber 25 shutting off the supply of fluid pressure to the receptacle 1. The port 18$^b$ and the passage 26, however, will be in communication with the port 18$^c$ whereby the air will be exhausted from the receptacle 1. When the float 8 arises to a predetermined level the shaft 17 is rocked so as to open the valve whereby the air under pressure will be supplied to the receptacle 1 and the water expelled therefrom, when the float lowers, the shaft 17 will be rocked in the opposite direction thereby closing the valve and shutting off the air supply to the receptacle 1.

It is evident from the foregoing construction and arrangement of parts that air under pressure is supplied automatically to the receptacle 1 to expel the water therefrom when the water has risen to a predetermined level and that when the level of the water lowers to a predetermined point in the receptacle 1 the supply of air under pressure is automatically shut off and the air is also exhausted from the receptacle 1.

What I claim is:—

A device for the purpose set forth comprising a closed water collecting receptacle having a water inlet means, a water conducting pipe extending through the top of said receptacle and permanently opening thereinto in proximity to the bottom thereof, means for supplying air under pressure of said receptacle to expel the water therefrom through said conducting pipe, a valve for opening and closing said means, a valve stem for actuating the valve, a pair of spaced collars carried by the valve stem, a weighted shiftable member straddling the valve stem and provided with a pair of impacting surfaces engaging with said collars to actuate the stem for opening and closing the valve, a float operated mechanism arranged permanently above the bottom of the receptacle, and an operative connection exteriorly of said receptacle and connected at one end to said mechanism and at its other end with said member for actuating the latter on the rise and fall of the water within the receptacle.

In testimony whereof I affix my signature in the presence of two witnesses.

JOSEPH JOY.

Witnesses:
 KARL H. BUTLER,
 JOHN STEPHANY.